US012620826B2

(12) United States Patent
Ning et al.

(10) Patent No.: US 12,620,826 B2
(45) Date of Patent: May 5, 2026

(54) SYSTEMS AND METHODS FOR INTELLIGENT REACTIVATION OF BATTERY CELLS OF BATTERY SYSTEMS

(71) Applicant: DELL PRODUCTS L.P., Round Rock, TX (US)

(72) Inventors: Yan Ning, Cedar Park, TX (US); Jui Chin Fang, Taipei (TW); Wen-Yung Chang, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 713 days.

(21) Appl. No.: 18/189,161

(22) Filed: Mar. 23, 2023

(65) Prior Publication Data

US 2024/0322586 A1     Sep. 26, 2024

(51) Int. Cl.
H02J 7/96     (2026.01)
H01M 10/44     (2006.01)
H02J 7/40     (2026.01)
H02J 7/50     (2026.01)
H02J 7/82     (2026.01)

(52) U.S. Cl.
CPC ............. H02J 7/96 (2026.01); H01M 10/441 (2013.01); H02J 7/40 (2026.01); H02J 7/50 (2026.01); H02J 7/825 (2026.01)

(58) Field of Classification Search
CPC ...... H02J 7/96; H02J 7/40; H02J 7/50; H01M 10/441
USPC ........................................................ 320/160
See application file for complete search history.

(56) References Cited

U.S. PATENT DOCUMENTS 5,686,815 A * 11/1997 Reipur .............. H01M 10/4257
                                                    320/116
7,378,819 B2   5/2008 Wang et al.
7,391,184 B2   6/2008 Luo et al.
7,436,149 B2  10/2008 Luo et al.
7,595,609 B2   9/2009 Wang et al.
8,138,722 B2 * 3/2012 Wang ...................... H02J 9/005
                                                    320/135

(Continued)

OTHER PUBLICATIONS

Batteriesinaflash, "Battery C Rating Explained and Demystified", Obtained from Internet Mar. 1, 2023, 2 pgs.

(Continued)

*Primary Examiner* — Richard V Muralidar
(74) *Attorney, Agent, or Firm* — Egan, Enders & Huston LLP.

(57)     ABSTRACT

Systems and methods are provided that may be implemented to automatically and intelligently re-activate battery cell/s of a battery system after the battery system has been subjected to relatively long term storage with the battery system inactive and unpowered by external power. The disclosed systems and methods may be so automatically implemented once external power is provided to the battery system and the battery system becomes active again. In one example, the disclosed systems and methods may be implemented on a battery-powered information handling system using logic executing on a programmable integrated circuit of a battery system (e.g., battery management unit "BMU") of the information handling system and/or at the system level (e.g., such as embedded controller "EC") of the information handling system.

21 Claims, 3 Drawing Sheets

(56)                    References Cited

U.S. PATENT DOCUMENTS

| | | | | |
|---|---|---|---|---|
| 8,922,329 | B2 * | 12/2014 | Davis ........................ | H02J 7/04 |
| | | | | 340/5.1 |
| 9,300,015 | B2 | 3/2016 | Chang et al. | |
| 10,496,509 | B2 | 12/2019 | Thompson et al. | |
| 2023/0141602 | A1 * | 5/2023 | Tamaki ................... | H02J 7/825 |
| | | | | 320/132 |
| 2023/0301640 | A1 * | 9/2023 | Acevedo ............. | H01M 10/425 |
| 2024/0250547 | A1 * | 7/2024 | Klein ..................... | H02J 7/933 |

OTHER PUBLICATIONS

Spendiff-Smith, "What Is a Battery C Rating & How Do I Calculate C Rate-Power Sonic", Obtained from Internet Feb. 21, 2023, 7 pgs.
QuantumScape, "Charge Rates for Next-Generation Batteries QuantumScape", Nov. 23, 2021, 8 pgs.
Aung et al., "Systems and Methods for Optimizing Battery Life in Information Handling Systems Using Intelligence Implemented in Storage Systems", U.S. Appl. No. 18/110,724, filed Feb. 16, 2023, 37 pgs.

\* cited by examiner

SYSTEMS AND METHODS FOR INTELLIGENT REACTIVATION OF BATTERY CELLS OF BATTERY SYSTEMS

FIELD

This application relates to battery systems and, more particularly, to reactivation of battery cells of battery systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many cases, batteries may be subjected to a long storage time before they are used in a system or between system usages. For example, computer batteries may sit unused (without charging or discharging) for four months or longer before a first power-on and boot of the computer occurs. This may occur, for example, when a corporation purchases a batch of multiple computers, and stores these new computers for months before distributing them to their employees for first use. In another example, computers that are owned by a school district may sit unused and unpowered over the summer months.

Long battery storage time has a detrimental impact to lithium ion battery reliability and long-term battery performance. During long-term battery storage, a failure mechanism occurs in which the battery solid electrolyte interface (SEI) and cathode electrolyte interface (CEI) thickness increases, and electrode kinetics decreases, leading to lithium-plating formation after battery cycling. Thus, the detrimental effects of long term battery storage may not be easily observed over the short-term; but result in battery degradation that is significant in the later life of the battery. Consequences of battery degradation due to long-term storage adversely affect the battery performance, and increase warranty and service costs.

A battery storage mode has been used to shut down a battery management unit (BMU) or battery gas gauge of a computer smart battery pack to reduce battery self-discharge during long term storage. However, even while in this battery storage mode, battery degradation still occurs to battery cells of the smart battery pack during long-term storage.

It is known to implement a pre-charge function using a BMU of a computer smart battery pack. Using this pre-charge function, a small pre-charge current rate of 256 milliamps is applied for charging battery cells of the smart battery pack whenever the battery cells of the smart battery pack are in an under-voltage condition (typically less than 3 volts). Once the under-voltage battery cells of the smart battery pack are sufficiently charged by this pre-charge current so that they are no longer in the under-voltage condition (typically 3 volts or more), the charge current rate for charging the battery cells increases to a normal charge rate (typically 0.5 C). However, use of this pre-charge function does not improve battery cell characteristics and battery cell reliability that have degraded due to exposure of the battery cells to long term storage.

SUMMARY

Disclosed herein are systems and methods that may be implemented to automatically and intelligently re-activate battery cell/s (e.g., lithium ion battery cell/s) of a battery system after the battery system has been subjected to relatively long term storage with the battery system inactive and unpowered by external power, e.g., such as when an information handling system that includes the battery system is shut down and disconnected from external power. The disclosed systems and methods may be so automatically implemented once external power is provided to the battery system and the battery system becomes active again, e.g., such as when an information handling system that includes the unpowered battery system is plugged into an AC adapter for charging of the battery cell/s of the battery system. In one embodiment, the disclosed systems and methods may be implemented on a battery-powered information handling system using logic executing on a programmable integrated circuit of a battery system (e.g., battery management unit "BMU") of the information handling system and/or at the system level (e.g., such as embedded controller "EC") of the information handling system.

In one embodiment, the disclosed systems and methods may be automatically implemented when a previously inactive battery system becomes active to first determine whether the battery cell/s of the battery system have been subjected to a relatively long term storage since last usage (i.e., charging or discharging) of the battery cell/s. This determination may be made based on one or more determined battery system storage characteristics, e.g., such as measured amount of elapsed storage time since the battery system was active and used, change (e.g., reduction) in total battery cell state of charge (SOC) percentage of all the battery cell/s combined, current total remaining SOC percentage value of all the battery cell/s combined, current minimum individual battery cell voltage of all the battery cell/s within the battery system, incremental percentage change in total DC internal resistance (DCIR) of all the battery cell/s combined, etc. If it is determined from the one or more battery system storage characteristics that the battery cell/s of the battery system have been subjected to relatively long term storage, then the disclosed systems and methods are then implemented to automatically and intelligently re-activate the long-term stored battery cell/s using a relatively small charging current (e.g., such as 0.1 C charge rate or lower current charge rate) rather than a relatively larger default or normal charge rate (e.g., such as 0.5 C standard or default charge rate, 0.8 C express charge rate, or higher levels of express charge) that is employed for battery cell charging if it is determined that the battery cell/s of the battery system have not been subjected to long term storage.

In one embodiment, the disclosed automatic and intelligent re-activation of long-term stored lithium ion battery cell/s may be advantageously implemented to reform thickness of the battery cell solid electrolyte interface (SEI) and cathode electrolyte interface (CEI) layers properly, increase battery cell electrode lithium ion transfer kinetics, reduce or eliminate lithium plating, and/or improve long-term battery cell performance and reliability, etc.

Thus, the disclosed systems and methods may be implemented in one embodiment to achieve automated battery reactivation in an information handling system operation environment together with intelligent determination of a target reactivation charging current for each specific battery system and its battery cell/s based on the storage history of the battery system. Advantages that may be realized using the disclosed systems and methods include, but are not limited to, providing battery cell reactivation for a battery system only when it is needed based on the battery system storage history, automatically performing battery cell reactivation in an information handling system operation environment without requiring human manual intervention or special equipment in a way that saves repair cost and labor, preventing long term battery cell degradation, retaining a higher battery system runtime, increasing sustainability, and improving information handling system user experience and satisfaction.

In one respect, disclosed herein is a method of operating a battery system having one or more battery cells, the method comprising: monitoring a status of the battery system to determine that the battery system has transitioned from being inactive to currently being active; and determining current battery system storage characteristics, the determined current battery system storage characteristics comprising at least a duration of elapsed storage time that the battery was inactive prior to the battery system transitioning from inactive to active; then accessing predefined target charge rate information and determining a current target charge rate based on the determined current battery system storage characteristics and the predefined target charge rate information; and then charging the battery cells with a charging current that is equal to the current target charge rate.

In another respect, disclosed herein is a system, comprising a battery system having one or more battery cells; and at least one programmable integrated circuit programmed to: monitor a status of the battery system to determine that the battery system has transitioned from being inactive to currently being active; determine current battery system storage characteristics, the determined current battery system storage characteristics comprising at least a duration of elapsed storage time that the battery was inactive prior to the battery system transitioning from inactive to active; then access predefined target charge rate information and determine a current target charge rate based on the determined current battery system storage characteristics and the predefined target charge rate information; and then charge the battery cells with a charging current that is equal to the current target charge rate.

In another respect, disclosed herein is a method of operating a battery system having one or more battery cells, the method comprising: monitoring a status of the battery system to determine that the battery system has transitioned from being inactive to currently being active; determining current battery system storage characteristics, the current battery system storage characteristics comprising multiple different current battery system storage characteristics; then accessing predefined target charge rate information and determining a current target charge rate based on the determined current battery system storage characteristics and the predefined target charge rate information by: first separately determining a different indicated target charge rate value based on each of the multiple different current battery system storage characteristics and the predefined target charge rate information, then comparing the different indicated target charge rate values against each other to determine which one of the different indicated target charge rate values is smallest among all of the different indicated target charge rate values, and then selecting the smallest indicated target charge rate value as the current target charge rate; and then charging the battery cells with a charging current that is equal to the current target charge rate.

DESCRIPTION OF ILLUSTRATIVE EMBODIMENTS

Figure 1:
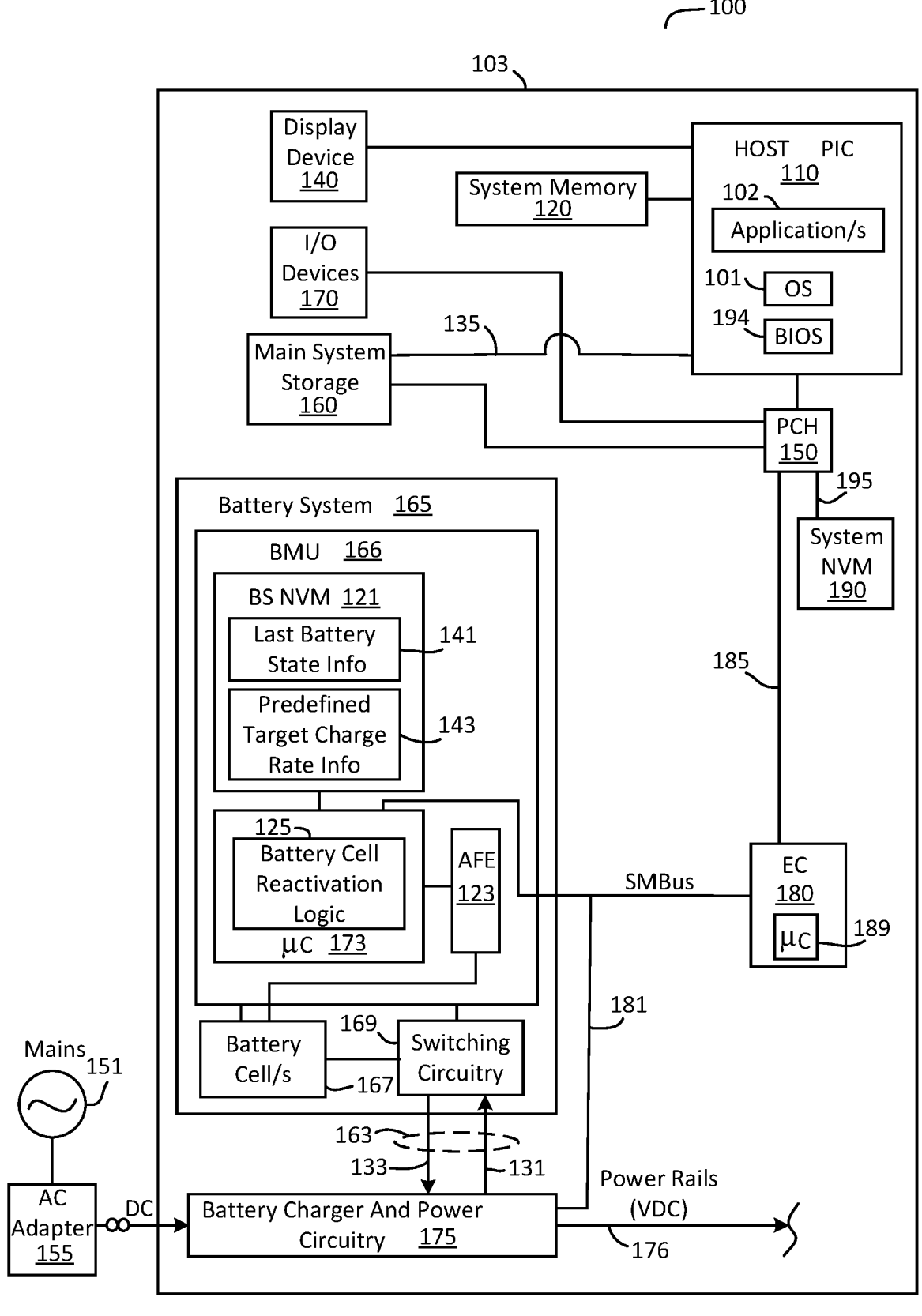
FIG. 1 illustrates a block diagram of a battery-powered information handling system according to one exemplary embodiment of the disclosed systems and methods.

FIG. 1 is a block diagram of a battery-powered information handling system 100 (e.g., an information handling system such as a laptop computer, notebook computer, tablet computer, convertible computer, cell phone, etc.) as it may be configured according to one embodiment of the disclosed systems and methods. In this regard, it should be understood that the configuration of FIG. 1 is exemplary only, and that the disclosed systems and methods may be implemented on other configurations of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a host programmable integrated circuit (Host PIC) 110 executing an operating system (OS) 101 (e.g., proprietary OS such as Microsoft Windows 10, open source OS such as Linux OS, etc.) and BIOS 194 for system 100, as well as other logic code such as user software applications 102 (e.g., word processing application, Internet browser, computer game, PDF viewer, spreadsheet application, etc.), etc. In the embodiment of FIG. 1, host programmable integrated circuit 110 may be configured to access non-volatile memory 190 (e.g., serial peripheral interface (SPI) Flash memory) to load and boot part of a system BIOS 194. Host programmable integrated circuit 110 may include any type of processing device, such as an Intel central processing unit (CPU), an Advanced Micro Devices (AMD) CPU or another programmable integrated circuit. Host programmable integrated circuit 110 is coupled as shown to system volatile memory 120, which may include, for example, random access memory (RAM), dynamic RAM (DRAM), synchronous DRAM (SDRAM), etc.

In the illustrated embodiment, host programmable integrated circuit 110 may be coupled to an external or internal (integrated) display device 140 (e.g., LCD or LED display or other suitable display device) depending on the particular configuration of information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide additional or redundant graphics capability for information handling system 100.

In the exemplary embodiment of FIG. 1, PCH 150 controls certain data paths and manages information flow between certain components of information handling system 100. As such, PCH 150 may include one or more integrated controllers or interfaces for controlling the primary data paths connecting PCH 150 with host programmable integrated circuit 110 and input/output (I/O) devices 170 forming at least a part of a user interface for the information handling system, out-of-band programmable integrated circuit (e.g., embedded controller) 180, and system NVM 190 where BIOS firmware image and settings 197 may be stored together with other components such as ACPI firmware, etc. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit (PC) interface, a Universal Serial Bus (USB) interface and a Thunderbolt™ interface.

As shown in FIG. 1, battery charger and power circuitry 175 (e.g., battery charging apparatus, main charger regulator and controller, charger, etc.) is included within information handling system 100 to selectably receive input direct current (DC) power from multiple power sources, and is coupled to provide regulated DC output power and operating voltage on one or more power rails 176 to various power-consuming components of information handling system 100 including, for example, those components of system 100 that are described and illustrated in FIG. 1. Power for information handling system 100 may be provided to battery charger and power circuitry 175 from an external power source (e.g., AC mains 151 through AC adapter 155), and/or from an internal power source in the form of one or more battery cell/s 167 of battery system 165 (e.g., a lithium ion ("Li-ion") or nickel metal hydride ("NiMH") smart battery pack). It will be understood that external power may be alternatively provided to information handling system 100 from any other suitable external power source (e.g., such as an external DC power source) or that AC adapter 155 may alternatively be integrated within information handling system 100, e.g., such that AC mains 151 supplies AC power directly to components inside chassis enclosure 103 (e.g., plastic and/or metal enclosure) of information handling system 100. In the illustrated embodiment, AC adapter 155 is removably coupled to, and separable from, battery charger and power circuitry 175 of information handling system 100 at mating interconnection terminals 191 and 192 in order to provide information handling system 100 with a source of DC power to selectably provide charging current 131 to charge battery cell/s 167 of battery system 165 across power conductor/s 163 and/or to supplement or replace DC power

133 that is selectably provided across power conductor/s 163 by battery cell/s 167 of battery system 165.

Battery system 165 (e.g., smart battery or smart battery pack) may include one or more rechargeable battery cell/s 167 and a BMU 166 (e.g., battery gas gauge) that itself may include, for example, an analog front end ("AFE") 123, non-volatile memory (NVM) 121, and microcontroller 173. As described further herein, microcontroller 173 of BMU 166 may be programmed to execute battery cell reactivation logic 125 and battery system NVM 121 may store pre-defined target charge rate information 143 (e.g., previously-stored table/s or equation/s empirically determined in a laboratory or factory environment for the particular configuration of battery system 165 and types and number of its integrated battery cell/s 167) and last (most recent previous) battery state information 141 that is determined and stored during each iteration of methodology 200 as described further herein.

Microcontroller 173 of BMU 166 may also be coupled to control switching circuitry 169 (e.g., metal-oxide-semiconductor field-effect transistors "MOSFET") within battery system 165 to control flow of discharging current from battery cell/s 167 and flow of charging current to battery cell/s 167. Microcontroller 173 of BMU 166 may also be coupled via its AFE 123 to sense and/or determine battery cell state information (e.g., values) for battery cell/s 167 such as remaining battery cell power capacity (e.g., total battery state of charge "SOC" for all battery cell/s combined expressed as a percentage, where 0%=empty (or no remaining battery cell capacity) and 100%=full remaining battery cell capacity), battery cell current flow, current measured voltage of each individual battery cell 167 (e.g., to allow comparison of all the current battery cell voltages to determine the current minimum individual battery cell voltage value among all battery cell/s 167 contained within the battery system 165), total battery cell DC internal resistance (DCIR) for all battery cell/s combined, etc. In this regard, microcontroller 173 may be coupled via AFE 123 to make voltage, current and resistance measurements of battery cell/s 167 and, and may be programmed to use these measurements to determine the battery cell state information. Battery system NVM (BS NVM) 121 of battery system 165 may also store code, data, and instructions for execution and/or use by microcontroller 173, e.g., including code for battery cell reactivation logic 125, historical battery cell operation data (e.g., battery cell voltage and current, battery usage history, etc.).

Battery charger and power circuitry 175 of information handling system 100 provides DC output power for power rail/s 176 that power a system load (power-consuming components) of information handling system 100. Battery charger/power circuitry 175 also provides DC power 131 across power conductor/s 163 for charging battery cell/s 167 of the battery system 165 during battery charging operations. Battery charger and power circuitry 175 may include, among other things, regulator circuitry such as a microcontroller (e.g., charger controller), one or more field effect transistors (FETs), an inductor, and a current sense resistor. The microcontroller may control opening and closing of one or more of the field effect transistors (FETs) to regulate a duty-ratio of current pulses provided to the battery cell/s 167 of the battery system 165 so as to selectably provide a currently designated charging current 131 from battery charger and power circuitry 175 to battery system 165 through the inductor and the current sense resistor.

Further information on configuration and operation of battery system 165, BMU 166, battery charger/power circuitry 175 (e.g., battery charging apparatus, main charger regulator and controller, charger, etc.), including battery charging operations and measurement and determination of battery cell state information, may be found in U.S. Pat. Nos. 7,378,819, 7,391,184, 8,138,722 and 9,300,015, each of which is incorporated herein by reference in its entirety for all purposes.

In one embodiment, battery system 165 may be contained within a cavity of a battery compartment that is defined within chassis enclosure 103 of information handling system 100. In one such embodiment, battery system 165 may be an interchangeable or user-replaceable battery pack that is provided with external power and data connector terminals for contacting and making temporary (e.g., non-soldered) interconnection with mating power connector terminals and data connector terminals provided within the battery pack compartment, e.g., to exchange power through power conductor/s 163 with battery charger and power circuitry 175 of the information handling system 100, as well as to exchange data across data bus 181 with EC 180 of the information handling system 100. In another embodiment, battery system 165 may be a non-replaceable or permanent battery pack that is enclosed (or captured) within information handling system chassis enclosure 103 and may have power connector terminals and data connector terminals that are optionally soldered to power conductors 163 and data bus 181. Further information with respect to example operation and configuration of battery system 165 may be found, for example, in U.S. Pat. No. 7,595,609, in U.S. Pat. No. 7,436,149, and in U.S. Pat. No. 10,496,509, each of which is incorporated herein by reference in its entirety for all purposes.

As shown, external and/or internal (integrated) I/O devices 170 (e.g., a keyboard, mouse, touchpad, touchscreen, etc.) may be coupled to PCH 150 of system 100 to enable a human user to input data and interact with information handling system 100, and to interact with application programs or other software/firmware executing thereon.

Also shown present in FIG. 1 is main system non-volatile storage 160 (e.g., solid state drive, hard disk drive, etc.) for storing code, data, and instructions for use by various components (e.g., including host programmable integrated circuit 110) of system 100. In this embodiment, main system storage 160 is coupled to PCH 150 and/or may also be coupled through PCIe bus 0 to host programmable integrated circuit 110.

As shown in FIG. 1, EC 180 is coupled to PCH 150 and may include an integrated programmable integrated circuit that is programmed to execute program instructions to boot information handling system 100, execute thermal system management, etc. EC 180 may include, for example, an integrated microcontroller 189 or other integrated programmable integrated circuit such as microprocessor, ASIC, or programmable logic device "PLD" such as FPGA, complex programmable logic device "CPLD", etc. In one embodiment, integrated programmable integrated circuit 189 of EC 180 may operate as an out-of-band programmable integrated circuit that is separate and independent from in-band host programmable integrated circuit 110 running the host OS 101, and integrated programmable integrated circuit 189 of EC 180 may execute without management of any application or other logic executing on host OS 101.

As shown in the exemplary embodiment of FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device. In such a configuration, PCH 150 provides EC 180 shared access to NVM 190 via eSPI bus 185, SPI bus 195, and various interface and logic blocks included within the PCH 150.

Figure 2:
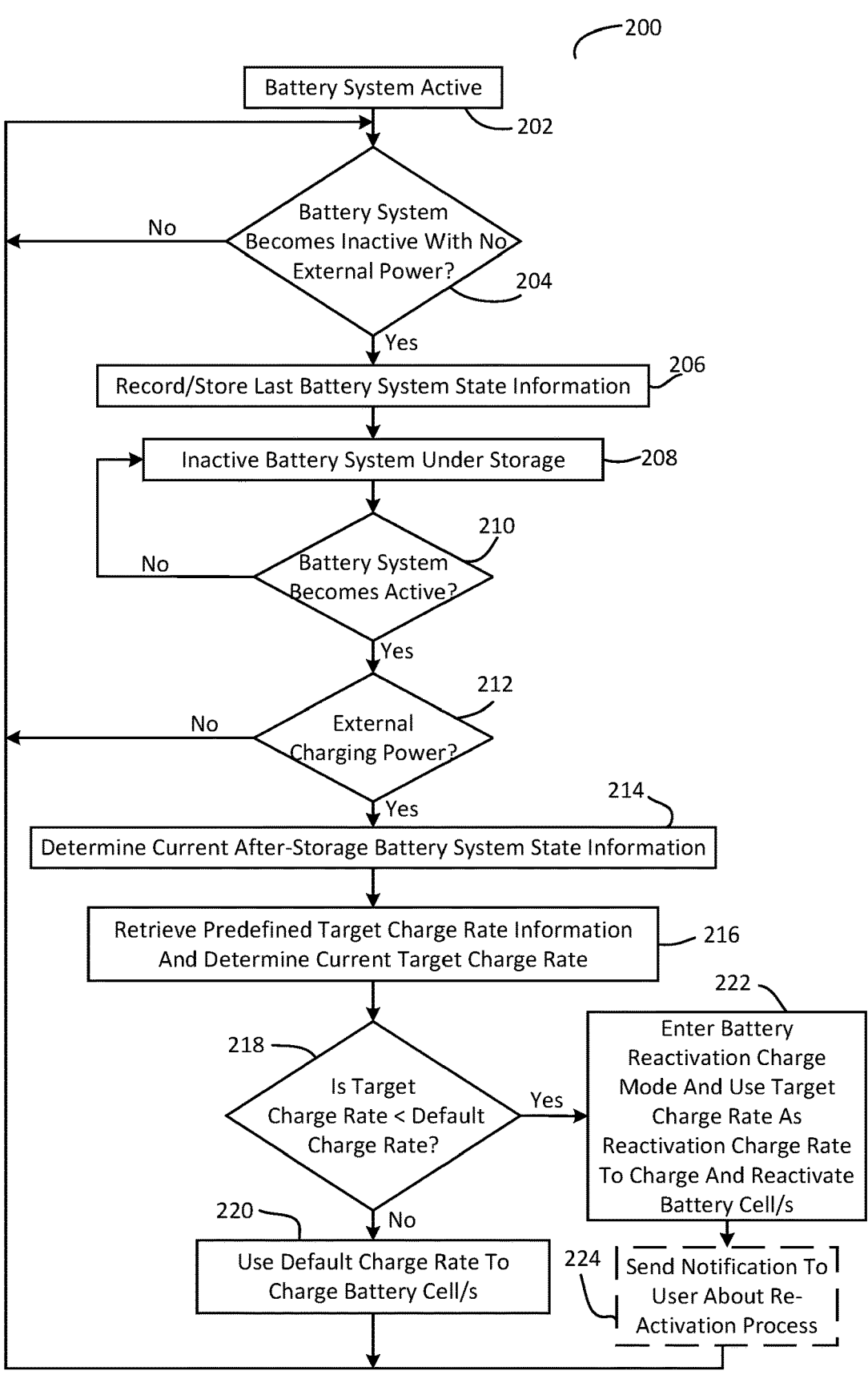
FIG. 2 illustrates methodology according to one exemplary embodiment of the disclosed systems and methods.

FIG. 2 illustrates methodology 200 that may be implemented in one embodiment of the disclosed systems and methods to determine battery system storage characteristics of a battery system 165, and to automatically and intelligently re-activate battery cell/s 167 (e.g., lithium ion battery cell/s) of the battery system 165 after the battery system 165 has been subjected to relatively long term storage during which the battery system 165 has been inactive with no external power provided by AC adapter 155 and therefore no DC charging current 131 provided across power conductor/s 163 from battery charger and power circuitry 175 to battery system 165. In one exemplary embodiment, methodology 200 may be implemented by battery cell reactivation logic 125 executing on microcontroller 173 of BMU 166 of information handling system 100, e.g., which may in turn may provide instructions via SMBus 181 to EC 180 to cause EC 180 to use SMBus 181 to provide instructions to control battery cell charging operation (including charging rate) of battery charger and power circuitry 175. However, in other embodiments, methodology 200 may be implemented by another programmable integrated circuit of information handling system 100, e.g., such as logic executing on microcontroller 189 of EC 180 which may receive battery state information (e.g., battery cell usage data, battery cell voltage data, battery cell SOC data, battery cell DCIR data, etc.) across SMBus 181 from BMU 166, and then provide instructions across SMBus 181 to battery charger and power circuitry 175 in order to control battery cell charging operation (including charging rate) of battery charger and power circuitry 175.

As shown, methodology 200 begins in block 202 with battery system 165 active (e.g., with information handling system 100 powered on and battery cell/s 167 charging or discharging via power conductor/s 163). In block 204 it is determined whether or not battery system 165 has become inactive (i.e., with no charging or discharging of battery cell/s via power conductor/s 163) and with no external power being provided to battery charger and power circuitry 175 by AC adapter 155, e.g., such as may occur with disconnection (e.g., unplugging or disabling) of AC adapter 155 together with power down of information handling system 100. In one embodiment, microcontroller 189 of embedded controller 180 may monitor for the presence of a plugged-in and powered AC adapter 155, and then provide an adapter presence signal (i.e., that indicates the presence or absence of AC adapter 155) to microcontroller 173 of BMU 166. Thus, in one embodiment of 204, embedded controller 180 may check for the presence or absence of the connected and powered AC adapter 155, and then pass a message or other type of adapter presence signal to microcontroller 173 of BMU 166 that communicates status of AC adapter 155 to microcontroller 173 of BMU 166.

In one embodiment, BMU 166 may shut down during the time that battery system 165 is inactive, with the exception that BMU microcontroller 173 may periodically check for signals such as from embedded controller 180 and maintain a battery system clock that keeps track of current day and time. Using this battery system clock, microcontroller 173 may record time stamps of the date (or date and time of day) when battery system 165 becomes inactive, of the date (or date and time of day) when AC adapter 155 is re-connected (e.g., plugged in or enabled), etc. These time stamps may be used to determine information such as an amount of elapsed storage time between the date (or date and time of day) of the last (or most recent previous) usage (e.g., charge or discharge) of battery cell/s 167 and the current date (or current date and time of day), etc.

If in block 204 it is determined that battery system 165 has not become inactive and/or external power is being provided to battery charger and power circuitry 175 by AC adapter 155 in block 204, then block 204 repeats so as to continue monitoring the external power state and activity state of battery system 165. However, if it is determined in block 204 of methodology 200 that battery system 165 has transitioned to become inactive and no external power is being provided to battery charger and power circuitry 175 by AC adapter 155, then methodology 200 proceeds to block 206 where the last (i.e., most recent previous) battery system state information obtained and/or calculated by BMU microcontroller 173 before the battery system 165 became inactive in block 204 without any external power being provided from AC adapter 155 is determined and recorded, e.g., stored as last (i.e., most recent previous) battery state information 141 in battery system NVM 121. This last battery system state information may include, for example, the date (or date and time of day) of the last usage (e.g., charge or discharge) of battery cell/s 167 and/or last (most recent previous) battery cell state information such as the last total SOC % value of all battery cell/s 167 combined, the last measured individual battery cell voltage of each of the battery cell/s 167 contained within the battery system 165, and the last total DCIR value (e.g., in milliohms) of all battery cell/s 167 combined, etc. Methodology 200 then proceeds to block 208 where battery system 165 is considered to be inactive and under storage (i.e., with no provided external power).

In block 210, methodology 200 then monitors whether or not battery system 165 has become active again (i.e., when it is determined that charging or discharging of battery cell/s 167 has occurred). As shown, block 210 may iteratively repeat as necessary until battery system 165 has become active again. When it is determined in block 210 that battery system 165 has transitioned to become active again (i.e., it is determined that charging or discharging of battery cell/s 167 has occurred), then methodology 200 proceeds to block 212 where it is determined whether external power is currently being provided from AC adapter 151. If it is determined in block 212 that no external power is currently being provided by AC adapter 151, then charging of battery cell/s 167 is not possible, and methodology 200 then returns to block 204 and repeats.

However, if it is determined in block 212 of methodology 200 that external power is being provided by AC adapter 151, then charging of battery cell/s 167 is possible, and methodology 200 proceeds to block 214 where current (after-storage) battery system state information is determined including, for example, the current date (or current date and time of day), and/or current battery cell state information such as the current total SOC % value of all battery cell/s 167 combined, the current minimum (or lowest) individual battery cell voltage among all individual battery cells 167 contained within the battery system 165 (e.g., as determined by measuring the current individual battery cell voltage of each of the individual battery cell/s 167 of battery system 165 and comparing the current individual battery cell voltage of each of the individual battery cell/s 167 with each other to determine the lowest measured current battery cell voltage value among all the battery cells 167 within battery system 165), the current total DC internal resistance (DCIR) of all battery cell/s 167 combined, etc.

Also, in block 214, the last (or most recent previous) battery system state information 141 of block 206 is accessed (e.g., retrieved in block 214 from battery system NVM 121), and one or more current battery system storage characteristics for battery system 165 is determined. Such current battery system storage characteristics may be calculated or otherwise determined, for example, based on the current after-storage battery system state information, and/or on differences between the current after-storage battery system state information determined in block 214 and the corresponding last (or most recent previous) battery system state information 141 of block 206 that is accessed (e.g., retrieved) in block 214 from battery system NVM 121. Differences between the current after-storage battery system state information determined in block 214 and the corresponding last (or most recent previous) battery system state information 141 of block 206 represent the change in the corresponding respective battery system state information that have occurred since the date (or date and time of day) of last usage of battery cell/s 167.

Examples of such current battery system storage characteristics for battery system 165 include, but are not limited to, an amount of elapsed storage time between the date (or date and time of day) of the last (or most recent previous) usage (e.g., charge or discharge) of battery cell/s 167 and the current date (or current date and time of day, a determined change between the last (or most recent previous) total SOC % value of all battery cell/s 167 combined and the current total SOC % value of all battery cell/s 167 combined (expressed in a percentage, where 0%=empty (or no remaining battery cell capacity) and 100%=full remaining battery cell capacity), a current remaining total SOC % value of all battery cell/s 167 combined, the current minimum (or lowest) individual battery cell voltage among all individual battery cells 167, a determined incremental percentage change between the last (or most recent previous) total DCIR resistance value of all battery cell/s 167 combined and the current total DCIR resistance value of all battery cell/s 167 combined, etc. For purposes of illustration, exemplary embodiments of equations for determining total SOC change value and incremental total DCIR percentage change are provided below:

$$\text{Total } SOC \text{ change value of all battery cell/s}$$
$$\text{combined=most recent previous total } SOC \text{ \%}$$
$$\text{value of all battery cell/s combined-current}$$
$$\text{total } SOC \text{ \% value of all battery cell/s com-}$$
$$\text{bined.}$$

$$\text{Incremental total DCIR percentage change value of}$$
$$\text{all battery cell/s combined=[(current total DCIR}$$
$$\text{resistance value of all battery cell/s combined-}$$
$$\text{most recent previous total DCIR resistance}$$
$$\text{value of all battery cell/s combined)/(most}$$
$$\text{recent previous total DCIR resistance value of}$$
$$\text{all battery cell/s combined)]×100.}$$

Next, in block 216, predefined target charge rate information 143 is accessed (e.g., retrieved from battery system NVM 121), and a current target charge rate value for battery cell/s 167 is determined (as described further below) based on the determined current battery system storage characteristics of block 214 and the predefined target charge rate information 143.

Table 1 below illustrates one exemplary embodiment of target charge rate information 143 as it may be implemented as a reactivation charge rate lookup table that may be predefined and stored in battery system NVM 121 before execution of the blocks of methodology 200 (e.g., during manufacture of information handling system 100 or as part of a firmware update downloaded to information handling system 100 after manufacture). Besides a lookup table, it will be understood that predefined target charge rate information 143 may take other forms, e.g., such as a separate different polynomial equation or other type of mathematical equation which may be predefined in one embodiment to calculate the indicated target charge rate for each different battery system storage characteristic.

The particular example values of Table 1 correspond to an exemplary battery system 165 that is characterized as having an operating charge range between 100% SOC at individual battery cell voltage of 4.4 volts and 0% SOC at individual battery cell voltage of 3 volts, and that has a designated pre-charge rate (e.g., manufacturer's design pre-charge rate) of 256 milliamps when the individual battery cell voltage is less than 3 volts. For this exemplary battery system 165, individual battery cell voltages less than 3 volts indicate that the battery system 165 has been severely depleted or discharged to a state below its operating charge range. It will be understood that the operating voltage range and other values of Table 1 are exemplary only, and that the disclosed systems and methods may be implemented with battery systems 165 having different operating charge ranges, e.g., such as operating charge ranges having a 100% SOC at an individual battery cell voltage greater or less than 4.4 volts and/or having a 0% SOC at an individual battery cell voltage greater or less than 3 volts.

In this embodiment, Table 1 represents a relationship between multiple different types of battery system storage characteristics (in the leftmost four columns) and corresponding values of indicated target charge rate (in the rightmost column). In this regard, the leftmost four columns of Table 1 correspond to four exemplary types of battery system storage characteristics, and each of these battery system storage characteristic columns includes row values that vary together with increasing elapsed battery cell storage time from the topmost row value to the bottommost row value. It will be understood that in other embodiments, target charge rate information 143 may include a greater or lesser number of types of battery system storage characteristics. It will also be understood that other alternative types of battery system storage characteristics that are representative of battery cell storage time may alternatively or additionally be employed for target charge rate information 143.

Also, in Table 1 below, the rightmost column of Table 1 includes values of indicated target charge rate that decrease in value from the topmost row value to the bottommost row value as elapsed storage time increases (with corresponding changes to the values of the battery system storage characteristics). In this example, indicated target charge rate decreases in Table 1 from a highest default charge rate value (e.g., of 0.5 C) in the top value row for relatively shorter elapsed storage times to a lowest charge rate value of 256 milliamps (e.g., equal to a designated design pre-charge rate for the exemplary battery system of this embodiment) in the bottom value row for relatively longer elapsed storage times and a severely depleted or discharged minimum (or lowest) individual battery cell voltage level (of less than 3 volts in the current example). It will be understood that the indicted target charge rate values of Table 1 are exemplary only, and that other combinations of greater and/or lesser indicated target charge rate values may be employed in other embodiments. It will also be understood that the five rows of battery system storage characteristic values versus corresponding indicated target charge rate values that are present in Table 1 are exemplary only, and that in other embodiments, a lookup table may include more or less than five rows of battery system storage characteristic values versus corresponding indicated target charge rate values.

TABLE 1

| | Battery System Storage Characteristic | | | | |
| --- | --- | --- | --- | --- | --- |
| Elapsed Storage Time of Battery Cell/s | Total SOC Change of All Battery Cell/s Combined (from Last SOC % to Current SOC %) | Current Total SOC % of All Battery Cell/s Combined/Current Minimum (Lowest) Individual Battery Cell Voltage Measured Within the Battery System | Incremental Percentage Change in Total DCIR of All Battery Cell/s Combined | Indicated Target Charge Rate of All Battery Cell/s Combined |
| Less than 4 months | Less than 30% SOC reduction | SOC of greater than 10% | 0% | Default Charge Rate (e.g., 0.5 C) |
| 4 months up to 6 months | 30% up to 45% SOC reduction | SOC of 10% down to 5% | Greater than 0% up to 5% DCIR increase | 0.1 C* |
| Greater than 6 months up to 9 months | Greater than 45% up to 60% SOC reduction | SOC of less than 5% down to 2% | Greater than 5% up to 10% DCIR increase | 0.08 C* |
| Greater than 9 months up to 12 months | Greater than 60% up to 75% SOC reduction | SOC of less than 2% with current minimum (lowest) individual battery cell voltage of greater than 3 volts | Greater than 10% up to 15% DCIR increase | 0.06 C* |
| Greater than 12 months | Greater than 75% SOC reduction | SOC of less than 2% with current minimum (lowest) individual battery cell voltage of 3 volts or less | Greater than 15% DCIR increase | 256 milliamps |

TABLE 1-continued

| | Total SOC Change of All Battery Cell/s Combined (from Last SOC % to Current SOC %) | Current Total SOC % of All Battery Cell/s Combined/Current Minimum (Lowest) Individual Battery Cell Voltage Within the Battery System | Incremental Percentage Change in Total DCIR of All Battery Cell/s Combined | Indicated Target Charge Rate of All Battery Cell/s Combined |
|---|---|---|---|---|
| Elapsed Storage Time of Battery Cell/s | | | | |

*Battery C-Rate is a measurement of the current at which the combined battery cell/s 167 of battery system 165 are charged or discharged, with 1 C corresponding to the rated capacity of the battery system 165 in milliamp-hours (mAh) of the combined battery cell/s 167 (e.g., a 2 C charge rate fully charges combined battery cell/s 167 in 30 minutes from their fully depleted state, a 1 C charge rate fully charges combined battery cell/s 167 in one hour from their fully depleted state, 0.5 C charge rate charges combined battery cell/s 167 in two hours from their fully depleted state, etc.). Example charge rate values for a battery system 165 rated at 5000 mAh are: a 1 C charge rate is 5000 milliamps, a 0.8 C charge rate is 4000 milliamps, a 0.5 C charge rate is 2500 milliamps, a 0.1 C charge rate is 500 milliamps, a 0.08 C charge rate is 400 milliamps, and a 0.06 C charge rate is 300 milliamps.

In the example of Table 1, a indicated target charge rate value is defined to independently correspond to different values or ranges of values for each different determined current battery system storage characteristic. In this embodiment, an indicated target charge rate value is first separately determined in block 216 from Table 1 for each different current battery system storage characteristic that has been determined in the current iteration of block 214, and then the smallest determined indicated target charge rate value is selected as the current target charge rate value.

To illustrate, the following underlined indicated target charge rate values may be first determined in block 216 from Table 1 assuming the following underlined example current battery system storage characteristics previously determined in a hypothetical current iteration of block 214: 0.1 C indicated target charge rate value determined for 5 months elapsed storage time of battery cell/s 167; 256 milliamp indicated target charge rate value determined for 80% reduction in total SOC of all battery cell/s 167 combined; 0.06° C. indicated target charge rate value determined for less than 2% current total SOC % of all battery cell/s 167 combined with greater than 3 volts current minimum (or lowest) individual battery cell voltage among all battery cell/s 167; and 0.06° C. indicated target charge rate value determined for 12% increase in DCIR of all battery cell/s 167 combined. Then, the smallest of these currently determined indicated target charge rate values (i.e., 256 milliamps) is selected in block 216 as the current target charge rate value. In this way, the current target charge rate value may be intelligently tuned based on the storage history of battery system 165.

Next, in block 218, it is determined whether the current target charge rate value from block 316 is less than the default charge rate (e.g., 0.5 C), e.g., that may be predefined and stored in NVM 121 of battery system 165) for normal charging of the combined battery cell/s 167 of battery system 165. If, in block 218, the current target charge rate value from block 216 is not less than the default charge rate (the current target charge rate is equal to the default charge rate), then methodology 200 proceeds to block 220 in which the combined battery cell/s 167 are charged at the default charge rate (e.g., 0.5 C), and then returns to block 204 as shown and iteratively repeats.

However if, in block 218, the current target charge rate value from block 216 is less than the default charge rate, then methodology 200 proceeds to block 222 in which a battery reactivation charge mode cycle is entered (i.e., initiated) during which the combined battery cell/s 167 are charged at the current target charge rate value determined in block 216. In block 222, the current target charge value is used as a reactivation charge rate to charge and reactivate battery cell/s 167 of battery system 165, e.g., by reforming thickness of the battery cell solid electrolyte interface (SEI) and cathode electrolyte interface (CEI) layers properly, increasing battery cell electrode lithium ion transfer kinetics, reducing or eliminating lithium plating, and/or improving long-term battery cell performance and reliability, etc. Further description of operation in block 222 is illustrated and described in relation to FIG. 3.

As further shown, optional block 224 may also be implemented (e.g., immediately after or simultaneously with entering (i.e., initiating) reactivation charge mode in block 222) to provide a notification to a human user of information handling system 100, e.g., via a command through EC 180 to cause host programmable integrated circuit 110 to display a text notice or icon on display device 140 that alerts the human user that the reactivation mode has been entered (i.e., initiated) and is in progress, and that it is being performed to protect battery long term performance. Such a notification may also optionally request that the user keep the AC adapter 155 plugged into system 100 to charge battery cell/s 167 and that if the full reactivation charge mode charging cycle is not completed before the AC adapter 155 is unplugged that the reactivation charge mode charging cycle will continue the next time the AC adapter is plugged back in to provide external power to information handing system 100. In any case, methodology 200 then returns as shown to block 204 and iteratively repeats.

It will understood that the particular combination of blocks of methodology 200 is exemplary only, and that other combinations of fewer, additional and/or alternative blocks may be employed that are suitable for determining battery system storage characteristics of a battery system 165 and automatically and intelligently reactivating battery cell/s 167 (e.g., lithium ion battery cell/s) of the battery system 165 after the battery system 165 has been subjected to a relatively long term storage period.

Figure 3:
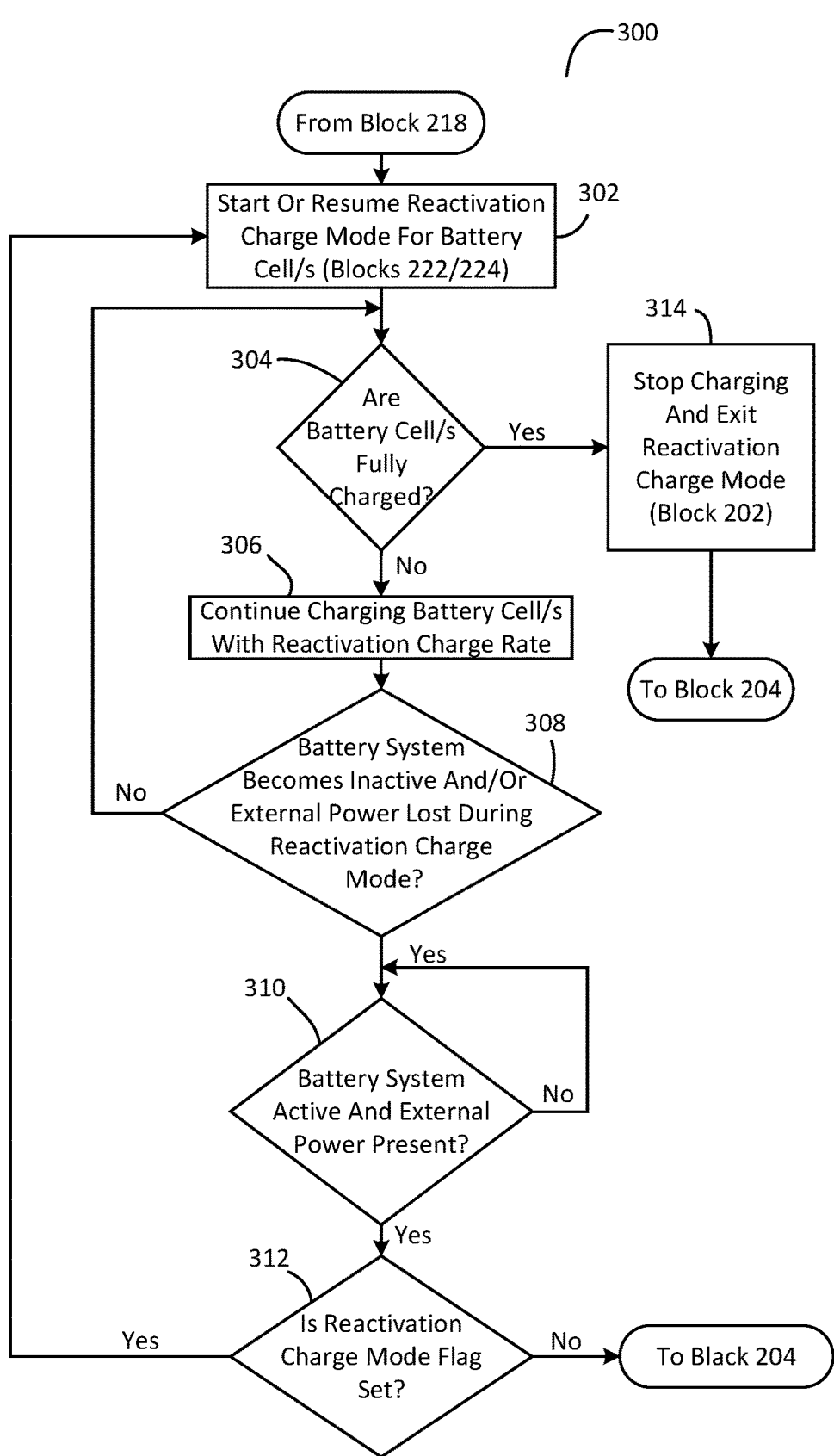
FIG. 3 illustrates methodology according to one exemplary embodiment of the disclosed systems and methods.

FIG. 3 illustrates one exemplary embodiment of an iterative methodology 300 that may be employed to implement reactivation charge mode cycle of block 222 of FIG. 2. In one exemplary embodiment, methodology 300 may be implemented by battery cell reactivation logic 125 executing on microcontroller 173 of BMU 166 of information handling system 100. As shown in FIG. 3, block 302 of methodology 300 may be initially entered from block 218 of FIG. 2, at which time reactivation charge mode may be started for battery cell/s 167 of battery system 165, and battery cell/s 167 of battery system 165 may then be charged at a reactivation charge rate that is equal to the current target charge value determined in the most recent previous iteration of block 216 of FIG. 2. In one optional embodiment, a reactivation charge mode flag may also be stored in NVM 121 of battery system 165 during block 302. This reactivation charge mode flag may indicate that a reactivation charge mode is currently under way, and may also include the current reactivation charge rate value being employed in block 304. In an optional embodiment, a previously-initiated reactivation charge mode may be resumed when block 302 is entered from block 312 of methodology 300 (as described further herein)

Next, in block 304, it is determined whether battery cell/s 167 are fully charged to a predefined full charge condition (e.g., charged to 100% SOC or a lesser predefined threshold value of SOC that is selected to represent a full charge condition for battery cell/s 167). If, in block 304, it is determined that battery cell/s 167 are fully charged to the predefined full charge condition, then methodology 300 proceeds to block 314 in which charging of battery cell/s 167 is stopped and the reactivation charge mode is exited. Upon completion of charging and exit from reactivation charge mode in block 314, the optional reactivation charge mode flag may be erased or removed from NVM 121. Methodology 300 then exits from block 314 and proceeds to block 204 of methodology 200 that has been previously described.

However if, in block 304, it is determined that battery cell/s 167 are not fully charged to the predefined full charge condition, then methodology 300 proceeds to block 306 and continues charging battery cell/s 167 at the reactivation charge rate that is equal to the current target charge value determined in the most recent previous iteration of block 216 of FIG. 2.

Next, in block 308 it is determined whether or not battery system 165 has become inactive and/or has lost external power (e.g. AC adapter 155 unplugged from system 100) while in still in the reactivation charge mode and charging battery cell/s 167 at the reactivation charge rate. If not, then methodology 300 returns to block 304 and repeats.

However, in the case that battery system 165 becomes inactive and/or loses external power (e.g. AC adapter 155 unplugged from system 100) before battery cell/s 167 are fully charged to the predefined full charge condition, then methodology 300 proceeds to block 310 where it is determined if the battery system 165 has become active again with external power present. If not, block 310 iteratively repeats as shown.

Upon determining in block 310 that battery system 165 has become active again with external power present (e.g. from plugged in AC adapter 155), then microcontroller 173 of BMU 166 may be programmed to automatically look in block 312 for the presence of the reactivation charge mode flag set in NVM 121 in block 302. If the reactivation flag mode is not found present in block 312, then methodology 300 exits and proceeds to block 204 of methodology 200 that has been previously described. However, if in block 312, the reactivation flag mode is found present in NVM 121, then methodology 300 automatically returns to block 302 of FIG. 3 to reinitiate the most recent previous reactivation charge mode using the most recent reactivation charge rate value for charging battery cell/s 167. In this way, the current reactivation charge rate value may be applied in block 304 for a full cycle, partial cycle, or multiple cycles depending on the storage history, e.g., such as interruption of reactivation charge mode charging due to removal of external charging power and/or shutdown of information handling system 100 during operation of a reactivation charge mode.

It will understood that the particular combination of blocks of methodology 300 is exemplary only, and that other combinations of fewer, additional and/or alternative blocks may be employed that are suitable for reactivating battery cell/s 167 (e.g., lithium ion battery cell/s) of the battery system 165 after the battery system 165 has been subjected to a relatively long term storage period.

Although described only for purposes of illustration with reference to FIG. 1, it will be understood that methodology 200 of FIG. 2 and methodology 300 of FIG. 3 may each be implemented in a similar manner using any alternative configuration of information handling system circuitry having a battery system that includes one or more battery cell/s for selectably powering power-consuming circuitry of the information handling system, and in which battery state inactivation and reactivation, battery cell state information and/or battery system storage characteristics of the battery system are monitored and/or determined, and in which the battery cell/s of the battery system are selectably charged by regulated charging power provided from a power source that is external to the battery cell/s of the battery system.

It will also be understood that one or more of the tasks, functions, or methodologies described herein (e.g., including those described herein for components 101, 102, 110, 120, 125, 140, 150, 155, 160, 165, 166, 170, 173, 175, 180, 189, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of operating a battery system having one or more battery cells, the method comprising:

monitoring a status of the battery system to determine that the battery system has transitioned from being inactive to currently being active;

determining current battery system storage characteristics, the determined current battery system storage characteristics comprising at least a duration of elapsed storage time that the battery was inactive prior to the battery system transitioning from inactive to active;

then accessing predefined target charge rate information and determining a current target charge rate based on the determined current battery system storage characteristics and the predefined target charge rate information; and then charging the battery cells with a charging current that is equal to the current target charge rate.

2. The method of claim 1, further comprising performing the following upon determining that the battery system has transitioned from inactive to active:

accessing most recent previous battery system state information for the battery system that was determined at the time that the battery system most recently became inactive prior to the battery system transitioning from inactive to active, the most recent previous battery system state information comprising at least the date or date and time of day that the battery system most recently became inactive prior to the battery system transitioning from inactive to active;

determining current battery system state information for the battery system at the time of the battery system transitioning from inactive to active, the determined current battery system state information comprising at least the date or date and time of day of the battery system transitioning from inactive to active; and determining the current battery system storage characteristics from the most recent previous battery system state information and the current battery system state information, where the duration of elapsed storage time that the battery was inactive comprises an elapsed time between the date or date and time of day that the battery system most recently became inactive and the date or date and time of day of the battery system transitioning from inactive to active.

3. The method of claim 1, where the determining a current target charge rate comprises determining the target charge rate value as a function of the predefined target charge rate information so that the determined target charge rate value decreases as a function of duration of elapsed storage time.

4. The method of claim 2, where the determined most recent previous battery system state information further comprises most recent previous battery cell state information; and where the determined current battery system state information further comprises current battery cell state information.

5. The method of claim 4, where the most recent previous battery cell state information comprises at least one of most recent previous total state of charge (SOC) of the combined battery cells, most recent minimum individual battery cell voltage measured within the battery system, or most recent previous total direct current internal resistance (DCIR) of the combined battery cells; where the current battery cell state information comprises at least one of current total state of charge (SOC) of the combined battery cells, current minimum individual battery cell voltage measured within the battery system, or current total direct current internal resistance (DCIR) of the combined battery cells; and where the determined current battery system storage characteristics further comprise at least one of change in total state of charge (SOC) of the combined battery cells from the most recent previous battery system state information to the current battery system state information, the current total state of charge (SOC) of the combined battery cells from the current battery system state information, the current minimum individual battery cell voltage measured within the battery system, or the incremental change in total direct current internal resistance (DCIR) of the combined battery cells from the most recent previous battery system state information to the current battery system state information.

6. The method of claim 1, where the current battery system storage characteristics comprise multiple different current battery system storage characteristics; and where the determining a current target charge rate comprises:

first separately determining a different indicated target charge rate value based on each of the multiple different current battery system storage characteristics and the predefined target charge rate information;

then comparing the different indicated target charge rate values against each other to determine which one of the different indicated target charge rate values is smallest among all of the different indicated target charge rate values; and then selecting the smallest indicated target charge rate value as the current target charge rate.

7. The method of claim 6, where the predefined target charge rate information defines each of a first indicated target charge rate that decreases in value as a function of increasing duration of elapsed storage time, a second indicated target charge rate that decreases in value as a function of increasing magnitude of change in total state of charge (SOC) of the combined battery cells from the most recent previous battery system state information to the current battery system state information, a third indicated target charge rate that decreases in value as a function of decreasing magnitude of current total state of charge (SOC) of the combined battery cells from the current battery system state information, and a fourth indicated charge rate that decreases in value as function of increasing magnitude of incremental change in total direct current internal resistance (DCIR) of the combined battery cells from the most recent previous battery system state information to the current battery system state information.

8. The method of claim 1, where the method further comprises initiating a reactivation charge mode cycle for the battery system as a result of determining a target charge rate value that is less than a predefined default charge rate; and fully charging the battery cells of the battery system with a charging current that is equal to the determined target charge rate value during the reactivation charge mode cycle.

9. The method of claim 8, further comprising responding to an interruption to the reactivation charge mode cycle prior to fully charging the battery cells of the battery system by then later resuming completion of the interrupted reactivation charge mode cycle to fully charge the battery cells of the battery system.

10. The method of claim 8, further comprising operating the battery system to provide power to power-consuming circuitry of an information handling system; and providing a notification to a human user of the information handling system upon initiating the reactivation charge mode cycle, the notification alerting the human user that the reactivation charge mode cycle has been initiated.

11. A system, comprising a battery system having one or more battery cells; and at least one programmable integrated circuit programmed to:

monitor a status of the battery system to determine that the battery system has transitioned from being inactive to currently being active;

determine current battery system storage characteristics, the determined current battery system storage characteristics comprising at least a duration of elapsed storage time that the battery was inactive prior to the battery system transitioning from inactive to active;

then access predefined target charge rate information and determine a current target charge rate based on the determined current battery system storage characteristics and the predefined target charge rate information; and then charge the battery cells with a charging current that is equal to the current target charge rate.

12. The system of claim 11, where the at least one programmable integrated circuit is further programmed to perform the following upon determining that the battery system has transitioned from inactive to active:

access most recent previous battery system state information for the battery system that was determined at the time that the battery system most recently became inactive prior to the battery system transitioning from inactive to active, the most recent previous battery system state information comprising at least the date or date and time of day that the battery system most recently became inactive prior to the battery system transitioning from inactive to active;

determine current battery system state information for the battery system at the time of the battery system transitioning from inactive to active, the determined current battery system state information comprising at least the date or date and time of day of the battery system transitioning from inactive to active; and determine the current battery system storage characteristics from the most recent previous battery system state information and the current battery system state information, where the duration of elapsed storage time that the battery was inactive comprises an elapsed time between the date or date and time of day that the battery system most recently became inactive and the date or date and time of day of the battery system transitioning from inactive to active.

13. The system of claim 11, where the at least one programmable integrated circuit is further programmed to determine the target charge rate value as a function of the predefined target charge rate information so that the determined target charge rate value decreases as a function of duration of elapsed storage time.

14. The system of claim 12, where the determined most recent previous battery system state information further comprises most recent previous battery cell state information; and where the determined current battery system state information further comprises current battery cell state information.

15. The system of claim 14, where the most recent previous battery cell state information comprises at least one of most recent previous total state of charge (SOC) of the combined battery cells, most recent previous minimum individual battery cell voltage within the battery system, or most recent previous total direct current internal resistance (DCIR) of the combined battery cells; where the current battery cell state information comprises at least one of current total state of charge (SOC) of the combined battery cells, current minimum individual battery cell voltage within the battery system, or current total direct current internal resistance (DCIR) of the combined battery cells; and where the determined current battery system storage characteristics further comprise at least one of change in total state of charge (SOC) of the combined battery cells from the most recent previous battery system state information to the current battery system state information, the current total state of charge (SOC) of the combined battery cells from the current battery system state information, the current minimum individual battery cell voltage within the battery system, or the incremental change in total direct current internal resistance (DCIR) of the combined battery cells from the most recent previous battery system state information to the current battery system state information.

16. The system of claim 11, where the current battery system storage characteristics comprise multiple different current battery system storage characteristics; and where the at least one programmable integrated circuit is further programmed to determine the current target charge rate by:

first separately determining a different indicated target charge rate value based on each of the multiple different current battery system storage characteristics and the predefined target charge rate information;

then comparing the different indicated target charge rate values against each other to determine which one of the different indicated target charge rate values is smallest among all of the different indicated target charge rate values; and then selecting the smallest indicated target charge rate value as the current target charge rate.

17. The system of claim 16, where the predefined target charge rate information defines each of a first indicated target charge rate that decreases in value as a function of increasing duration of elapsed storage time, a second indicated target charge rate that decreases in value as a function of increasing magnitude of change in total state of charge (SOC) of the combined battery cells from the most recent previous battery system state information to the current battery system state information, a third indicated target charge rate that decreases in value as a function of decreasing magnitude of current total state of charge (SOC) of the combined battery cells from the current battery system state information, and a fourth indicated charge rate that decreases in value as function of increasing magnitude of incremental change in total direct current internal resistance (DCIR) of the combined battery cells from the most recent previous battery system state information to the current battery system state information.

18. The system of claim 11, where the at least one programmable integrated circuit is further programmed to initiate a reactivation charge mode cycle for the battery system as a result of determining a target charge rate value that is less than a predefined default charge rate; and fully charge the battery cells of the battery system with a charging current that is equal to the determined target charge rate value during the reactivation charge mode cycle.

19. The system of claim 18, where the at least one programmable integrated circuit is further programmed to respond to an interruption to the reactivation charge mode cycle prior to fully charging the battery cells of the battery system by then later resuming completion of the interrupted reactivation charge mode cycle to fully charge the battery cells of the battery system.

20. The system of claim 18, where the system comprises and information handling system having power-consuming circuitry coupled to receive power from the battery cells of the battery system; and where the at least one programmable integrated circuit is further programmed to provide a notification to a human user of the information handling system upon initiating the reactivation charge mode cycle, the notification alerting the human user that the reactivation charge mode cycle has been initiated.

21. A method of operating a battery system having one or more battery cells, the method comprising:

monitoring a status of the battery system to determine that the battery system has transitioned from being inactive to currently being active;

determining current battery system storage characteristics, the current battery system storage characteristics comprising multiple different current battery system storage characteristics;

then accessing predefined target charge rate information and determining a current target charge rate based on the determined current battery system storage characteristics and the predefined target charge rate information by:

first separately determining a different indicated target charge rate value based on each of the multiple different current battery system storage characteristics and the predefined target charge rate information, then comparing the different indicated target charge rate values against each other to determine which one of the different indicated target charge rate values is smallest among all of the different indicated target charge rate values, and then selecting the smallest indicated target charge rate value as the current target charge rate; and then charging the battery cells with a charging current that is equal to the current target charge rate.

* * * * *